United States Patent [19]

Liesegang

[11] Patent Number: 4,946,117
[45] Date of Patent: Aug. 7, 1990

[54] MOUNTING CLIP FOR SUPPORTING PIPES IN UPRIGHT ORIENTATION

[75] Inventor: Gerhard Liesegang, Zeven, Fed. Rep. of Germany

[73] Assignee: Lisega GmbH, Fed. Rep. of Germany

[21] Appl. No.: 351,620

[22] Filed: May 15, 1989

[30] Foreign Application Priority Data

May 19, 1988 [DE] Fed. Rep. of Germany ........ 3817015

[51] Int. Cl.⁵ ............................................... F16L 3/00
[52] U.S. Cl. ..................................... 248/65; 248/67.5; 248/74.4
[58] Field of Search ............... 248/219.3, 219.4, 218.4, 248/62, 59, 60, 74.1, 74.4, 74.5, 65, 67.5, 56, 57, 55, 58

[56] References Cited

U.S. PATENT DOCUMENTS

| 2,447,830 | 8/1948 | Wood | 248/62 |
| 2,466,247 | 4/1949 | Land | 248/62 |
| 2,632,676 | 3/1953 | Everett, Sr. | 248/58 X |
| 2,816,726 | 12/1957 | White | 248/57 |
| 2,965,342 | 12/1960 | Goldstone | 248/57 |
| 3,602,468 | 8/1971 | Stone | 248/57 |

FOREIGN PATENT DOCUMENTS

| 605864 | 9/1960 | Canada | 248/62 |
| 644363 | 7/1962 | Canada | 248/57 |

Primary Examiner—David L. Talbott
Attorney, Agent, or Firm—Diller, Ramik & Wight

[57] ABSTRACT

A clip for supporting pipes or the like in a generally upright orientation comprising a pair of generally transversely spaced longitudinal plates each having opposite ends, a pair of generally longitudinally spaced transverse plates each spanning the longitudinal plates at the opposite ends thereof, and intermeshed slots at the ends of the longitudinal and transverse plates retaining the same in assembled relationship. A pair of carrier elements having opposing arcuate slots transversely span the longitudinal plates and are interlocked with a pipe for suspending the latter from a suitable support.

25 Claims, 4 Drawing Sheets

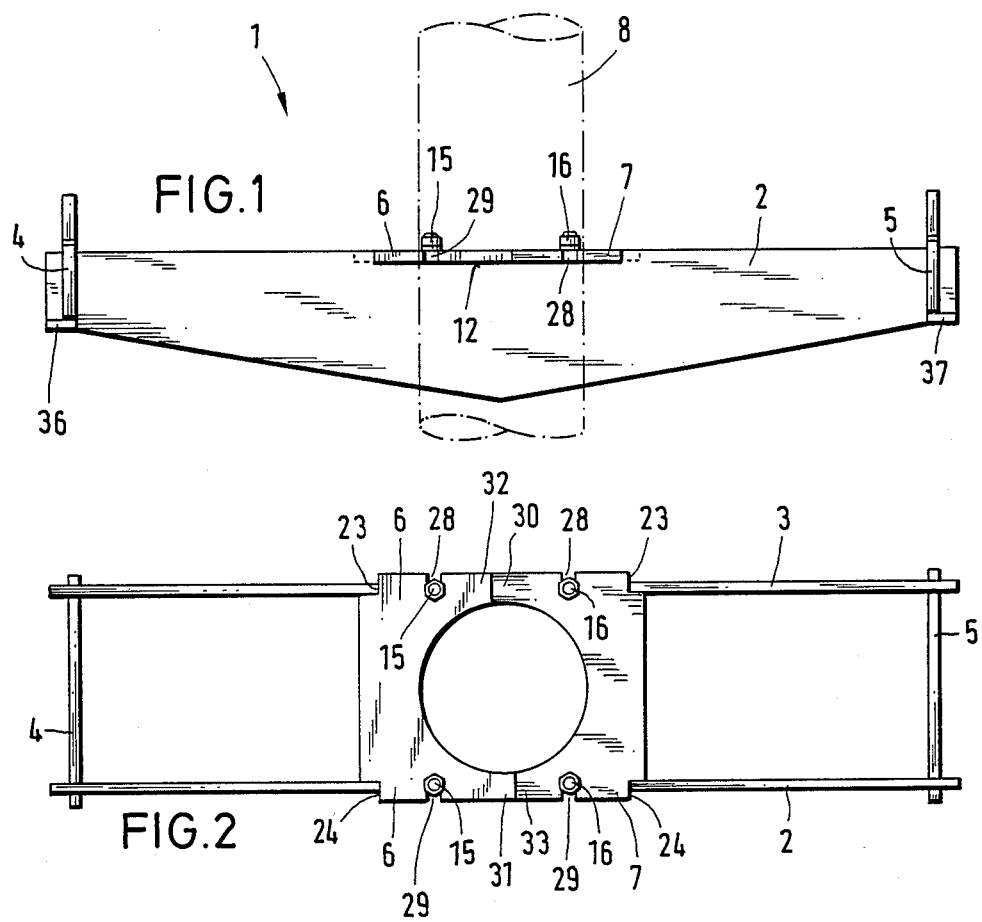

MOUNTING CLIP FOR SUPPORTING PIPES IN UPRIGHT ORIENTATION

BACKGROUND OF THE INVENTION

The invention relates to a mounting clip for supporting pipes generally vertically, obliquely or upright, in particular pipe systems of power stations, comprising a support frame adapted to encompass the pipe or the like and having ends which are provided with transverse support plates which are in turn connected to a suspension system.

Pipe clips which serve as a connection between the pipe line and the shock absorbing elements of a pipe line system in power station engineering applications are specifically designed for accepting dynamic forces. To this effect, such conventional pipe clips are made in the form of a rigid support trestle serving, on the one hand, to establish a connection to the pipe, and, on the other hand, to a stationary support. The rigid support trestle is either a welded construction or a steel casting of a relatively heavy weight whose manufacture is involved and expensive. Since a great number of such pipe clips are required for a pipe line system, the financial expenditure for such conventional pipe clips is high, apart from the fact that it is difficult to handle the heavy and rigid pipe clip.

SUMMARY OF THE INVENTION

Accordingly, it is an object of the present invention to provide a pipe mounting clip of the foregoing type whose weight is considerably reduced and can be easily handled. Further, the clip of the invention can be adapted easily to various pipe sizes. According to the invention, the problem of varying pipe sizes is solved in that the pipe clip is composed of individual transverse and longitudinal plate members, viz. two longitudinal plates, two transverse plates, and two carrier plates, elements or members, and the latter are all retained in a box-shaped configuration by mechanical interlocking means through the use of intermeshing slot-like connections.

The box-shaped pipe mounting clip can be produced simply and its handling is simple as well. Further, the pipe clip can be easily mounted and, within a predetermined range, it may be adapted to accommodate and support various sizes of pipe. Moreover, due to the invention the weight of the pipe clip may be 6 to 7 times less than that of a conventional pipe clip design.

According to another feature of the invention, the longitudinal plates have vertical slots at their ends while the central region of each longitudinal plate upper edge includes a cutout or slot situated symmetrically relative to the center and receives therein carrier elements. Transverse end plates are provided with vertical slots which lock with the slots of the longitudinal plates. By interfitting the longitudinal plate slots and the transverse plate slots, a simple box shape of the support frame, together with a reliable locking of the nested plates, is realized. A central area of the transverse plates comprise the suspension means for taking the load by the support frame. The suspension means at the transverse plates suitably consists of a closed hole through which a suspension eye or the like may be inserted.

The carrier elements receive and support the weight of an associated pipe by means of lugs secured at centers of the longitudinal plates. Preferably, one side of the carrier elements include corner cutouts, while the other side includes a semicircular cutout adapted to embrace the exterior of an associated pipe. The longitudinal sides of the carrier elements are provided with short transverse slots or longitudinal holes which are used to receive bolts carried by the longitudinal plates. Thus, the pipe is safely supported at the center of the pipe clip.

According to another feature of the invention, one edge of the semicircular cutout of each carrier element may comprise sections projecting beyond the center of the latter and, at the other end of the semicircular cutout, there are sections set back from the center so that the partition joints or faces between the two carrier elements placed against each other are disposed offset from the cutout center. Due to the latter construction the receiving tappets which are mounted diagonally, if possible, with respect to the longitudinal axis of the pipe cross section will not be positioned on a partition joint between the carrier elements.

A clamping plate is secured at the underside of the ends of the longitudinal plates to underengage the adjacent transverse plates to insure that without a load, the box-shape of the pipe clip will be maintained and the plates will not become disassembled.

In another embodiment of the pipe clip of the invention, the longitudinal plates may be provided with a central opening or slot which receives pins secured to the pipe. Further the longitudinal plates may be additionally secured in spaced relationship to each other by transverse bolts.

With the above, and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIGS. 1, 2 and 3 are respective elevational, plan and side views of one embodiment of a pipe clip of the invention, and illustrates two pairs of longitudinal, transverse and pipe carrier plates assembled in a generally box-shaped configuration.

DESCRIPTION OF THE PREFERRED EMBODIMENTS

Figure 4:
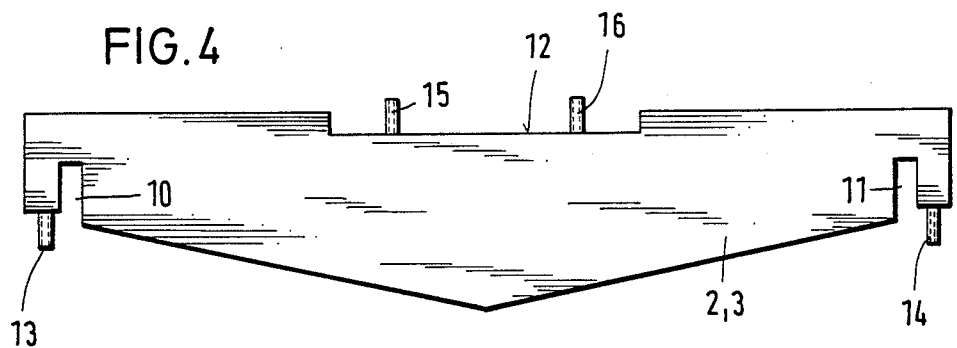
FIG. 4 is a side elevational view of one of two longitudinal plates and illustrates a central upwardly opening slot and two downwardly opening slots.

A novel pipe clip 1 of the invention (FIGS. 1–3) is composed only of individual plates or plate members comprising a pair of longitudinal plates 2, 3, transverse plates 4, 5 and carrier plates or elements 6, 7 interlocked together to form a box-shaped configuration for receiving therebetween a pipe 8. The locking of the individual plates 2 through 7 is effected by means of intermeshing and interlocking slot connections, as will be made more apparent hereinafter.

The longitudinal plates 2, 3 are provided near their ends (unnumbered) with slots 10, 11, which are adapted to be interlocked with slots 18, 19 of the transverse plates 4, 5 In the central region (unnumbered) at the top edges of the longitudinal plates 2, 3 there are cutouts 12 for receiving the carrier elements 6, 7. Further, each longitudinal plate 2, 3 carries threaded bolts 13, 14 at the lower edge and threaded bolts 15, 16 in each cutout 12. The purpose of the bolts 13 through 16 will be explained hereafter.

Figure 9:
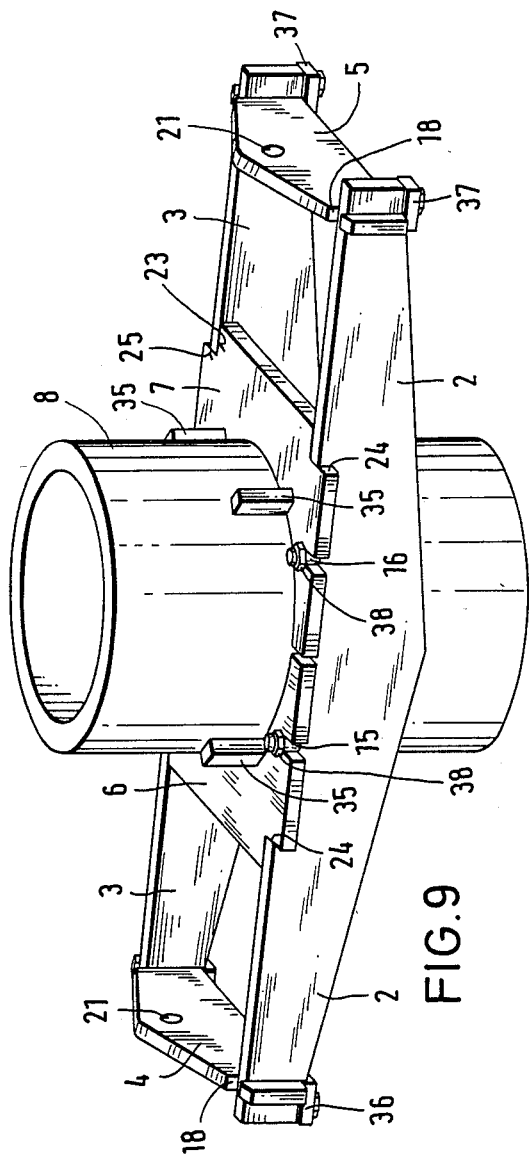
FIG. 9 is a perspective view of the pipe clip, and illustrates the fully assembled configuration thereof.

The transverse plates 4, 5 are interlocked with the longitudinal plates 2, 3 so as to serve as spacers for the latter, as is best shown in FIGS. 2 and 9. Vertical slots 18, 19 are provided near the ends of the transverse elements 4, 5 and open upwardly through upper edges (unnumbered) of the latter. The vertical slots 18, 19 interlock with the slots 10, 11 of the longitudinal plates 2, 3 in the manner clearly evident from FIGS. 4, 5 and 9. in the central area of the transverse plates 4, 5 suspension means is provided, preferably in the form of hole 21 for connection to a support element.

The carrier elements 6 and 7 are also formed from plates or plate members by punching or flame cutting a larger plate. The free ends (unnumbered) of the carrier elements 6 and 7 comprise slots or cutouts 23, 24 by which the carrier elements 6, 7 may be seated in the recesses or slots 12 of the longitudinal plates 2, At their opposing transverse sides or edges the carrier elements 6, 7 are provided with semicircular slots or cutouts 25, 26 adapted to receive therebetween the outside diameter of the pipe which is to be supported. The longitudinal sides or edges of the carrier elements 5, 6 include short longitudinal slots 28, 29 to enable threaded bolts 15, 16 carried by the longitudinal plates 2, 3 to extend therethrouqh.

At on end of each semicircular cutout 25, 26 each carrier element 6, 7 includes a portion or section 30, 31 (FIG. 2) projecting beyond a plane through the center of its associated cutout and a section or portion 32, 33 which does not project through the center plane. The carrier elements 6, 7 are so disposed with respect to each other that a long section or portion 30, 31 is always opposed to a short portion or section 32, 33, respectively. The carrier elements 6, 7 abut against the bottom of lugs or tappets 35 which are welded to the pipe 8 through which the pipe 8 is generally vertically supported by the pipe clip 1. Due to the mutually offset sections 30, 32 and 31, 33 and the points at which the tappets 35 are disposed on the pipe 8, the tappets 35 are prevented from being situated in the gaps between the sections 30, 32, 31, 33.

Figure 5:
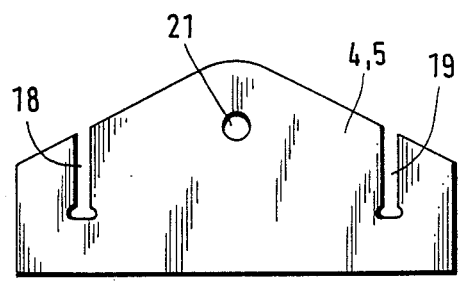
FIG. 5 is a side elevational view of one of two transverse plates of the pipe clip, and illustrates a pair of upwardly opening slots thereof.
Figure 6:
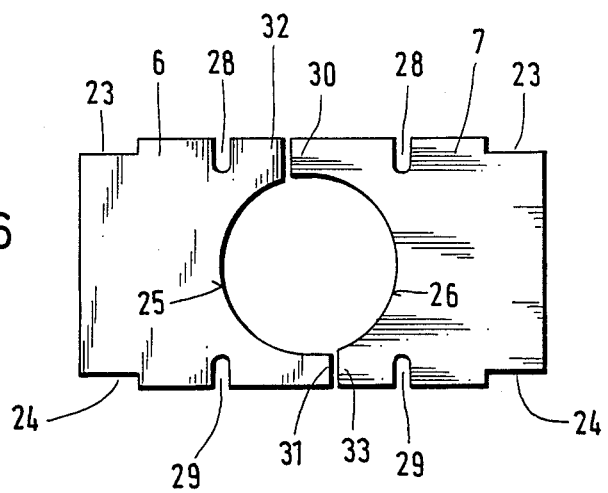
FIG. 6 is a top plan view of the two pipe carrier elements of the invention, and illustrates semicircular slots collectively defining a pipe-receiving opening.
Figure 7:
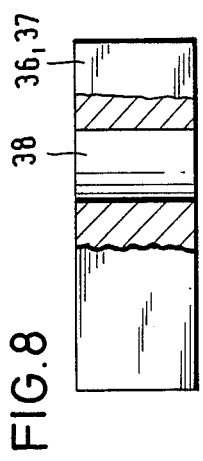
FIGS. 7 and 8 are plan and elevational views, respectively, the latter partly sectioned, of a safety clamping plate, and illustrate an opening for receiving a clamping bolt.
Figure 8:
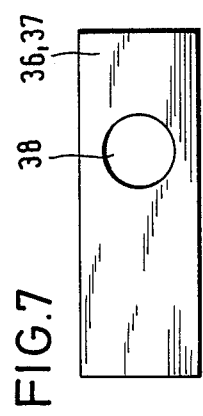

As is evident from FIG. 9, the longitudinal plates 2, 3 and the transverse plates 4, 5 form a closed box shape by interlocking or intermeshing with each other through the slots 10, 11 and 18, 19. Since the transverse plates 4, 5 are held in load-bearing relationship to a stationary support, the longitudinal plates 2, 3 inserted into the transverse plates 4, 5 are supported by the latter. To prevent the transverse plates 4, 5 from being displaced and detached from the longitudinal plates 2, 3 under no load conditions and/or when the clip 1 is not in use, a safety clamping plate 36, 37 is provided at the end of each longitudinal plate 2, 3 and threaded bolts 13, 14 at the ends of the longitudinal plates 2, 3 may pass. The clamping plates 36, 37 are secured by nuts (unnumbered) screwed on the bolts 13, 14 (FIGS. 4 and 9).

Due to the corner cutouts 23, 24, the carrier elements 6, 7 seat in and engage the recesses or slots 12 of the longitudinal plates 2, 3 while the longitudinal plates 2, 3 are also held thereby in transverse spaced generally parallel relationship. When the carrier elements 6, 7 are placed in the slots 12, they are secured by threaded bolts 15, 16 extending through the slots 28, 29. The carrier elements 6, 7 are prevented from lifting by nuts 38 threaded tightly against the carrier elements 6, 7.

Figure 10:
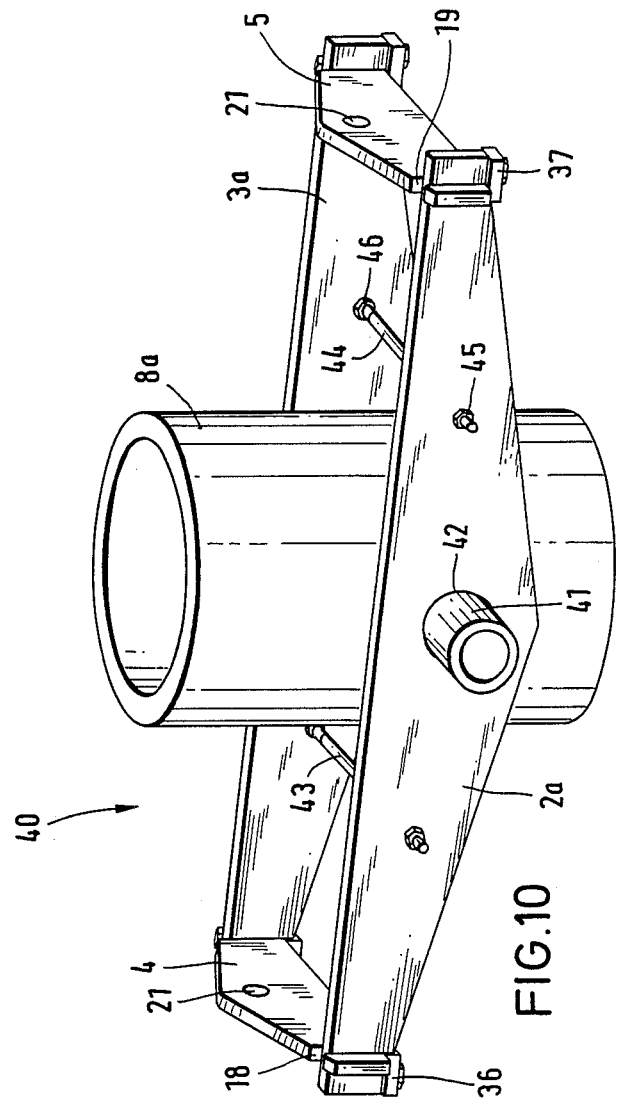
FIG. 10 is a perspective view of another embodiment of the box-shaped pipe clip of the invention, and illustrates an opening in a longitudinal plate receiving therein a projection of a pipe.

The embodiment of a pipe clip 40 of FIG. 10 is identical to that of FIGS. 1 through 9 except for the construction of longitudinal plates 2a, 3a. The mounting of the pipe 8a to the pipe clip 40 is achieved by projections, lugs or pins 41, fitted., e.g., by welding, at diametrically opposite points of the periphery of the pipe 8a. The projections 41 engage in bores, openings or slots 42 in the longitudinal plates 2a, 3a. In this pipe mounting clip 40, the carrier elements 6 and 7 are substituted for by the projections or carrier elements 41. To additionally maintain the spacing between the longitudinal plates 2a, 3a, transverse spacers 43, 44 are provided in the form of bars with threaded ends which, on both sides of the longitudinal plates 2a, 3a, may be provided with nuts 45 and 46 between which the longitudinal plates 2a, 3a are clamped.

Although a preferred embodiment of the invention has been specifically illustrated and described herein, it is to be understood that minor variations may be made in the apparatus without departing from the spirit and scope of the invention as defined in the appended claims.

I claim:

1. A clip for supporting pipes or the like in generally upright orientation comprising a pair of generally transversely spaced longitudinal plates each having opposite ends, a pair of generally longitudinally spaced transverse plates each spanning said longitudinal plates at the opposite ends thereof, means for securing said longitudinal and transverse plates to each other, a pair of carrier elements having cooperative means for supporting a pipe or the like therebetween in generally upright orientation, each of said carrier elements for longitudinal plates include cooperative intermeshed means bridgingly interconnecting said carrier elements in generally transverse spanning relationship between said longitudinal plates, said carrier elements are positioned between said transverse plates and generally atop upper edges of said longitudinal plates, and said cooperative intermeshed means include an upwardly opening slot in an upper edge of each of said longitudinal plates upon which said carrier elements seat.

2. The clip as defined in claim 1 wherein said securing means includes a slot in each longitudinal plate end slidably receiving therein an end of an associated transverse plate.

3. The clip as defined in claim 1 wherein said securing means include a slot in ends of each transverse plate slidably receiving therein an associated one of said longitudinal plate ends.

4. The clip as defined in claim 1 wherein said securing means includes a slot in each longitudinal plate end and a slot in ends of each transverse plate, and said longitudinal and transverse plate slots are paired in interlocked relationship at each juncture of adjacent longitudinal and transverse plate ends.

5. The clip as defined in claim 1 wherein said securing means includes a slot in each longitudinal plate end and a slot in ends of each transverse plate, said longitudinal plate slots are directed in opposed relationship to said transverse plate slots, and said longitudinal and transverse plate slots are paired in interlocked relationship at each juncture of adjacent longitudinal and transverse plate ends.

6. The clip as defined in claim 1 wherein said securing means includes a slot in each longitudinal plate end and a slot in ends of each transverse plate, said longitudinal plate slots are directed in opposed relationship to said transverse plate slots, all of said slots are disposed generally vertically, and said longitudinal and transverse plate slots are paired in interlocked relationship at each juncture of adjacent longitudinal and transverse plate ends.

7. The clip as defined in claim 1 including means carried by each transverse plate for suspending said clip and an associated pipe or the like from an appropriate support.

8. The clip as defined in claim 1 wherein said cooperative intermeshed means are further defined by edge portions of said carrier elements received in associated ones of said slots.

9. The clip as defined in claim 1 wherein said cooperative intermeshed means are further defined by edge portions of said carrier elements received in associated ones of said slots, each of said carrier element edge portions including a cutout in part defining a longitudinal edge of each carrier element, and each longitudinal edge being seated in an associated upwardly opening slot.

10. The clip as defined in claim 1 wherein said pipe supporting means includes a generally semicircular slot in each carrier element, and said semicircular slots open in opposed relationship to each other thereby to receive therebetween a pipe or the like.

11. The clip as defined in claim 1 wherein said longitudinal plates carry bolts received in slots of said carrier elements, and nuts threaded upon said bolts.

12. The clip as defined in claim 1 wherein said pipe supporting means includes a generally semicircular slot in each carrier element, each semicircular slot being set-off by a generally semicircular edge, each semicircular edge terminating at a transverse edge, and the transverse edges of each carrier element being disposed on the associated semicircular edge.

13. The clip as defined in claim 1 wherein said securing means includes an upwardly opening slot in opposite ends of each transverse plate slidably receiving therein a downwardly opening slot in said longitudinal plate ends, and a clamping plate spanning each downwardly opening slot thereby preventing disengagement of said transverse and longitudinal plates.

14. A clip for supporting pipes or the like in generally upright orientation comprising a pair of generally transversely spaced longitudinal plates each having opposite ends, a pair of generally longitudinally spaced transverse plates each spanning said longitudinal plates at the opposite end thereof, means for securing said longitudinal and transverse plate to each other, a pair of carrier elements having cooperative means for supporting a pipe or the like therebetween in generally upright orientation, each of said carrier elements and longitudinal plates include cooperative intermeshed means bridgingly interconnecting said carrier elements in generally transverse spanning relationship between said longitudinal plates, said carrier elements are positioned between said transverse plates, and said cooperative intermeshed means include a transverse opening through each of said longitudinal plates in which said carrier elements seat.

15. The clip as defined in claim 14 wherein said longitudinal plates are in generally parallel spaced relationship to each other, and spaced bolt means spanning said longitudinal plates for holding the same in generally parallel spaced relationship.

16. The clip as defined in claim 15 wherein said carrier elements each include a projection carried by an associated generally upright oriented pipe, and each projection is received in an associated one of said transverse openings.

17. The clip as defined in claim 16 wherein said projections are in generally axial alignment.

18. The clip as defined in claim 14 wherein said securing means includes a slot in each longitudinal plate end slidably receiving therein an end of an associated transverse plate.

19. The clip as defined in claim 5 wherein said securing means includes a slot in each longitudinal plate end and a slot in ends of each transverse plate, said longitudinal plate slots are directed in opposed relationship to said transverse plate slots, and said longitudinal and transverse plate slots are paired in interlocked relationship at each juncture of adjacent longitudinal and transverse plate ends.

20. The clip as defined in claim 14 wherein said carrier elements each include a projection carried by an associated generally upright oriented pipe, and each projection is received in an associated one of said transverse openings.

21. The clip as defined in claim 20 wherein said projections are in generally axial alignment.

22. The clip as defined in claim 20 wherein said securing means includes a slot in each longitudinal plate end and a slot in ends of each transverse plate, said longitudinal plate slots are directed in opposed relationship to said transverse plate slots, and said longitudinal and transverse plate slots are paired in interlocked relationship at each juncture of adjacent longitudinal and transverse plate ends.

23. The clip as defined in claim 22 wherein said projections are in generally axial alignment.

24. The clip as defined in claim 22 wherein said longitudinal plates are in generally parallel spaced relationship to each other, and spaced bolt means spanning said longitudnal plates for holding the same in generally parallel spaced relationship.

25. The clip as defined in claim 24 wherein said projections are in generally axial alignment.

* * * * *